Sept. 1, 1959   A. L. GIRARDI   2,902,142
FRUIT HARVESTING MECHANISM
Original Filed June 4, 1956
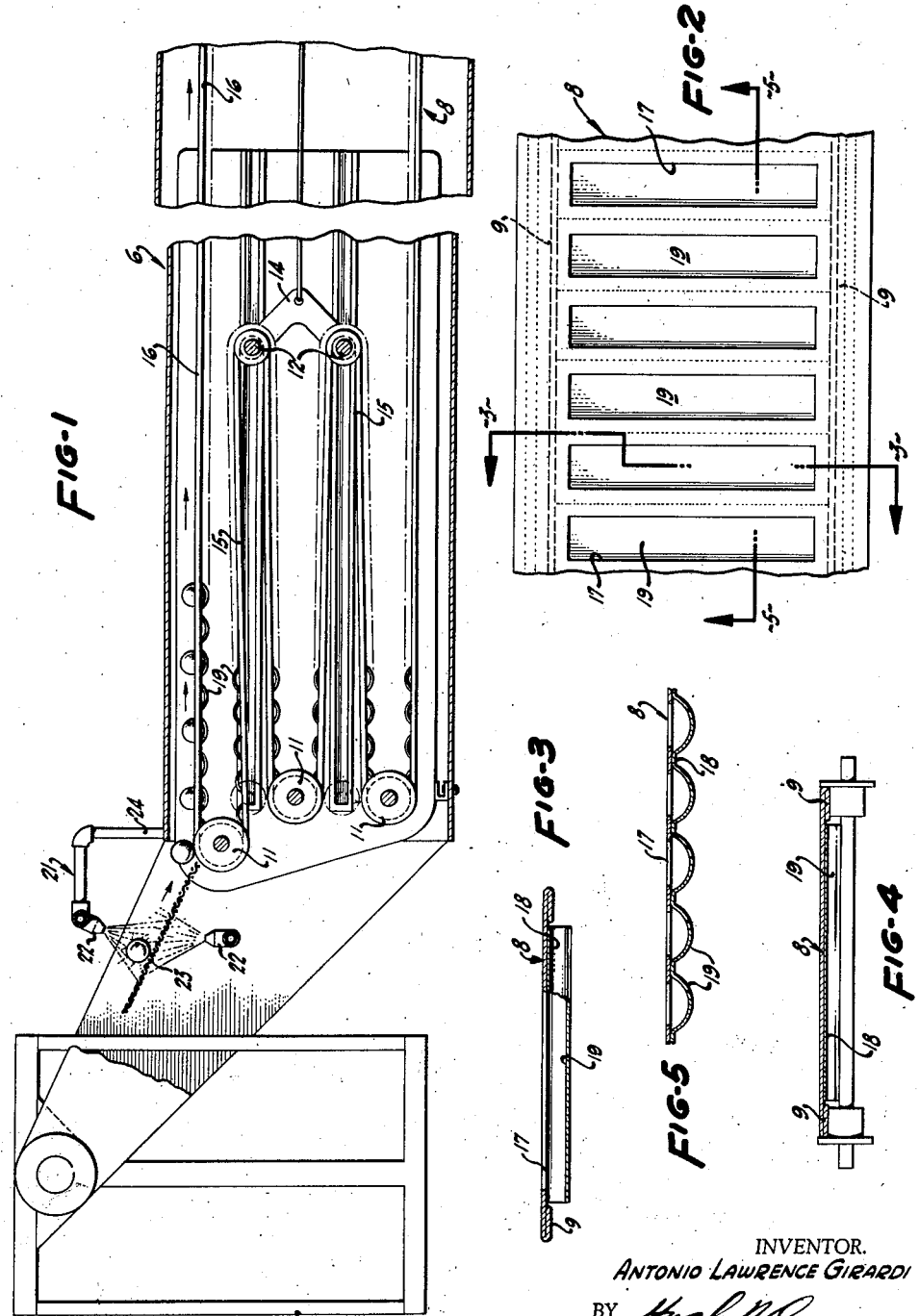
INVENTOR.
ANTONIO LAWRENCE GIRARDI
BY
ATTORNEY United States Patent Office 2,902,142
Patented Sept. 1, 1959

2,902,142
FRUIT HARVESTING MECHANISM

Antonio Lawrence Girardi, Stockton, Calif.

Original application June 4, 1956, Serial No. 589,081. Divided and this application February 18, 1957, Serial No. 640,661

5 Claims. (Cl. 198—139)

This invention relates to fruit harvesting mechanism of the general character of the Orchard Apparatus disclosed in my copending applications, Serial No. 492,433, filed March 7, 1955, now Patent No. 2,798,623, and Serial No. 570,165, filed March 7, 1956. More particularly this invention relates to mechanism for treating and conveying fruit from the hands of a picker to a delivery station; and is a division of my application, Serial No. 589,081, filed June 4, 1956.

Fruits, especially peaches, are easily bruised; and bruises not only impair the grade and the value of the fruit, but contribute to the rapid deterioration of the fruit by facilitating attack by spores, fungi, and other organisms which cause spoilage. For example, the spores that cause "brown rot" in peaches are easily spread from one peach to another; and the mere contact of a sound peach with an infected piece of fruit, or even with an area with which the infected piece has come in contact, may initiate spoilage which will seriously affect the marketableness of the fruit. At the time a peach is picked, the infection may be so slight as to escape observation by the picker. Still, contact with other peaches, or with surfaces with which other peaches come in contact, may cause the infection to spread so widely and so rapidly that large amounts of fruit may be reduced below acceptable standards before the fruit can be delivered to and graded by the packer or canner.

It is among the objects of the present invention to provide mechanism which will convey fruit from a picking station to a delivery station with a minimum likelihood of bruising and with a minimum exposure to contact with spores and similar damaging organisms spread by previously picked fruit.

Another object is to provide a conveyor which may be extended by and with an axially and angularly adjustable boom, throughout the range of movement of the boom, to safely carry fruit from the point of picking to the point of delivery.

It is also an object of this invention to provide means for directing spray material (liquids, powder, or gaseous) onto the freshly picked fruit before it has been exposed to contamination by contact with infected fruit or contaminated surfaces.

A further object is to provide an extensible belt construction adapted to minimize injury to fruit, and to permit a wide range of longitudinal extension within a minimum of transverse cross-sectional area.

A still further object is to provide an extensible conveyor belt provided with collapsible pockets movable over idler pulleys of small diameter engaging either face of the belt, the belt being so constructed as to obtain compactness, economy in construction, and efficiency in operation.

The invention has other objects and features of advantage, some of which, with the foregoing, will be hereinafter explained in connection with the illustrative embodiment of the invention shown in the accompanying drawings forming a part of the present specification. It is to be understood that the invention is not limited to the structural features shown in the drawings, as the invention may be embodied in other forms and the structural details may be variously modified within the scope of the appended claims.

In the drawings:

Fig. 1 is a fragmental side elevational view, partly in longitudinal vertical section, of a portion of a fruit picker's boom equipped with fruit treating and conveying mechanism embodying the present invention;

Fig. 2 is a fragmental plan view of a portion of a conveyor belt made in accordance with the present invention;

Fig. 3 is a fragmental transverse sectional view of the conveyor belt, the plane of the section being indicated by the line 3—3 of Fig. 2;

Fig. 4 is a transverse sectional detail showing the manner in which the collapsible pockets move over the idler pulleys; and Fig. 5 is a fragmental longitudinal sectional view, the plane of the section being indicated by the line 5—5 of Fig. 2.

In terms of broad inclusion, the device of the present invention comprises an extensible conveyor belt, movable by and with an extensible boom of a fruit picking machine throughout its range of movement, said conveyor being mounted over pulleys movable with the boom to take in and pay out whatever length of conveyor is necessary to accommodate axial extension and retraction of the boom. The conveyor belt is provided with a fabric backing having loops matching with openings in the belt to form pockets for the reception of fruit, and said loops being collapsible to permit movement of the conveyor belt over pulleys engaging either the outer or inner surface of the belt. The invention also contemplates the provision of means for directing spray material onto the fruit as it is delivered onto the conveyor.

In terms of greater detail, and in reference to the illustrative embodiment shown in the drawings, the device of the present invention comprises an extensible boom of the general character disclosed in my copending applications above referred to, said boom being designated in general by the numeral 6. The boom is extensible axially, and is movable angularly about vertical and horizontal axes for manipulating a picker's cage or platform 7 about adjacent surfaces of adjacent trees, as fully explained in said copending applications.

Mounted upon and substantially within the boom is an extensible conveyor designated in general by the numeral 8. The conveyor comprises a strip of material, preferably canvas or equivalent fabric, having its side edges doubled inwardly as at 9, and having its ends joined to form an endless belt. The conveyor belt is extended over main pulleys 11 mounted upon the ends of the boom, and over a plurality of yieldably movable idler pulleys 12 mounted upon a movable yoke 14, as indicated in Fig. 1 of the drawings. The idler pulleys 12 engage loops 15 of the conveyor belt, the loops being payed out and drawn in to accommodate extension and retraction of the boom so that the upper reach 16 of the conveyor will extend from a point near the cage 7 to a delivery point near the base upon which the boom is supported at any position of the cage within the range of axial and angular movement of the boom.

Openings 17 are formed at regular intervals along the length of the conveyor belt 8. As illustrated, the openings extend transversely of the belt, terminating slightly inwardly from the inturned edges 9. A strip of fabric 18, preferably canvas of a weight substantially less than that of the conveyor belt 8, is secured to the back or underside of the belt 8. The strip 18 is stitched or otherwise secured to the belt 8 between adjacent openings 17, with loops 19 matching with the openings to form pockets in back of the openings. The strip 18, and the loops 19 thereof, is sufficiently flexible to collapse and lie flat against the back of the belt 8 as it passes over a pulley engaging the belt.

Spray mechanism designated in general by the numeral 21 is mounted adjacent the outer end of the boom 6 and conveyor 8. The spray mechanism preferably comprises a pair of spray heads 22 arranged to direct spray material onto pieces of fruit from above and below so as to effectively spray the entire surface of each piece of fruit. The spray may be directed onto the fruit as it rolls along a screen or chute 23 extending between the picker's cage and the end of the conveyor, so as to subject the fruit to the spraying treatment before it reaches the conveyor. This treatment prevents active spores from being transferred from one piece of fruit to another, or to the surface of the conveyor belt.

In operation, the upper reach 16 of the belt extends in a straight path from the outer end of the boom 6 to its base. Fruit is delivered onto the outer end of the conveyor as it is picked from the trees by a picker occupying the cage 7. As the fruit approaches the conveyor, it is completely sprayed with material suitable for destroying spores and the like without impairing the fruit. Any of the approved commercial sprays, and including dusting powders and gaseous materials, may be applied in accordance with conventional spraying specifications. The spray material may be delivered to the spray head 22 through suitable pipe connections 24, which may include a length of flexible hose, not shown, arranged to permit the extension and retraction of the boom without disturbing the spray connections.

The spray material carried by the fruit is spread onto the surface of the conveyor so that fruit touching an area previously touched by an infected piece of fruit will not also become infected. This treatment effectively prevents spoilage beyond allowable limits between the time the fruit is picked and the time it is normally reached for grading by the packer or canner.

I claim:

1. A conveyor belt for orchard apparatus and the like comprising a strip of canvas having its ends joined to form an endless belt extensible over a plurality of relatively movable pulleys and having edge portions inwardly doubled and secured to the body of the strip for reinforcing the edges thereof, said strip having transverse openings spaced longitudinally along the length thereof, and a backing strip of flexible material secured to the canvas strip with loop portions matching with the openings to form collapsible pockets along the under side of the conveyor.

2. A conveyor belt as defined by claim 1 wherein the openings are of a length less than the space between the inturned edge portions of the canvas strip, and the backing strip is secured to the canvas strip between adjacent openings.

3. An extensible belt for orchard apparatus and the like comprising an endless strip of flexible material having transverse slot-like openings spaced at substantially regular intervals along the length thereof and extending across a major portion of the width of the strip, edge portions inturned along the longitudinal edges of the strip and secured to the body portion thereof for reinforcing the edges thereof, and a strip of relatively light fabric material secured to the back of the belt strip at points between the openings, said fabric strip being looped to form pockets matching with the openings and collapsible to permit movement of the belt over pulleys engaging the back thereof.

4. A conveyor belt for orchard apparatus and the like comprising an endless strip of flexible fabric belting having openings spaced longitudinally therealong and having edge portions of the strip inturned to provide reinforced edges along the sides of the conveyor with the openings positioned between the inturned edges, and a strip of flexible material attached to the back of the belting strip at points between the openings and being looped to form pockets matching with the openings.

5. A conveyor belt comprising an endless strip of flexible material of the character of canvas having transversely disposed slotlike openings spaced at regular intervals along the length of the strip and having edge portions of the strip inturned and secured to the body portion of the strip along substantially the full length thereof, and a backing strip of flexible material secured to the under side of the belt strip at points between the openings, said backing strip being looped to form collapsible pockets matching with the openings and being movable over pulleys engaging either face of the conveyor.

References Cited in the file of this patent

UNITED STATES PATENTS

| | | |
|---|---|---|
| 779,981 | White | Jan. 10, 1905 |
| 1,389,995 | Schutt | Sept. 6, 1921 |
| 2,104,431 | Marasso | Jan. 4, 1938 |
| 2,678,125 | Bonney | May 11, 1954 |

FOREIGN PATENTS

| | | |
|---|---|---|
| 27,903 | Great Britain | Dec. 22, 1908 |